US012638309B2

(12) United States Patent
Vasconcelos De Almeida et al.

(10) Patent No.: US 12,638,309 B2
(45) Date of Patent: May 26, 2026

(54) DEVICE FOR DETECTING AN APPROACH

(71) Applicant: Continental Automotive Technologies GmbH, Hannover (DE)

(72) Inventors: Joao Carlos Vasconcelos De Almeida, Toulouse (FR); Saïd Bouguern, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 119 days.

(21) Appl. No.: 18/683,675

(22) PCT Filed: Aug. 4, 2022

(86) PCT No.: PCT/EP2022/071940
§ 371 (c)(1),
(2) Date: Feb. 14, 2024

(87) PCT Pub. No.: WO2023/020850
PCT Pub. Date: Feb. 23, 2023

(65) Prior Publication Data
US 2024/0353240 A1 Oct. 24, 2024

(30) Foreign Application Priority Data
Aug. 19, 2021 (FR) ...................................... 2108763

(51) Int. Cl.
*H02J 50/10* (2016.01)
*G01D 5/24* (2006.01)
*E05B 81/78* (2014.01)

(52) U.S. Cl.
CPC ............ *G01D 5/2405* (2013.01); *E05B 81/78* (2013.01); *H02J 50/10* (2016.02)

(58) Field of Classification Search
None
See application file for complete search history.

(56) References Cited

U.S. PATENT DOCUMENTS 6,833,603 B1 * 12/2004 Park ...................... H01F 27/363
257/528
8,929,814 B2 * 1/2015 Cheikh .................... H01Q 7/00
455/41.1
(Continued)

FOREIGN PATENT DOCUMENTS

CN 102891352 A 1/2013
CN 103346819 A 10/2013
(Continued)

OTHER PUBLICATIONS

International Search Report and Written Opinion for International Application No. PCT/EP2022/073009, mailed Nov. 18, 2022, 17 pages.

(Continued)

*Primary Examiner* — Richard Isla
(74) *Attorney, Agent, or Firm* — Buchanan Ingersoll & Rooney PC

(57) ABSTRACT

A device for detecting an approach of a part of a user's body or of a portable user equipment, intended to be housed on board a motor vehicle, including: a near-field communication antenna configured to transmit signals at a high frequency selected between 3 and 30 MHz, the antenna being able to detect the approach of a portable user equipment and to communicate in near-field mode with the portable user equipment. The antenna including at least one winding that extends continuously in the form of a set of comb-shaped rods such that the antenna is able to generate a variation in capacitance in response to the approach of a part of a user's body; a controller for controlling the antenna; and a measurer for measuring a variation in impedance of the antenna, generated by the variation in capacitance.

10 Claims, 4 Drawing Sheets

(56) References Cited

U.S. PATENT DOCUMENTS

| | | | | |
|---|---|---|---|---|
| 9,214,269 | B2 * | 12/2015 | Samala | ............... H01F 17/0006 |
| 10,644,697 | B2 * | 5/2020 | Almholt | ............... H03K 17/955 |
| 12,030,442 | B2 * | 7/2024 | Sieg | ..................... H01Q 1/3283 |
| 12,448,822 | B2 * | 10/2025 | Vasconcelos De Almeida | ........... E05B 81/78 |
| 2004/0104815 | A1 | 6/2004 | Suyama et al. | |
| 2013/0244577 | A1 | 9/2013 | Cheikh | |
| 2021/0066802 | A1 | 3/2021 | Liu et al. | |
| 2021/0122334 | A1 | 4/2021 | Spick et al. | |
| 2021/0175930 | A1 | 6/2021 | Vassilieff et al. | |
| 2025/0138214 | A1 * | 5/2025 | Vasconcelos De Almeida | ........... G06K 7/10415 |

FOREIGN PATENT DOCUMENTS

| | | | |
|---|---|---|---|
| CN | 106401331 | A | 2/2017 |
| CN | 206878171 | U | 1/2018 |
| CN | 211046573 | U | 7/2020 |
| EP | 2006952 | A1 | 12/2008 |
| EP | 3197061 | A2 | 7/2017 |
| JP | 2004-175252 | A | 6/2004 |
| KR | 20140119534 | A | 10/2014 |

OTHER PUBLICATIONS

International Search Report and Written Opinion for International Application No. PCT/EP2022/073009, mailed Nov. 18, 2022, 14 pages (French).

French Search Report for French Application No. 2112322, dated Aug. 9, 2022 with translation, 10 pages.

Office Action (First Office Action) issued Jan. 16, 2026, by the National Intellectual Property Administration, P. R. China in corresponding Chinese Patent Application No. 202280056632.2 and an English translation of the Office Action. (23 pages).

* cited by examiner

Fig. 6

DEVICE FOR DETECTING AN APPROACH

CROSS REFERENCE TO RELATED APPLICATIONS

This application is the U.S. National Phase Application of PCT International Application No. PCT/EP2022/071940, filed Aug. 4, 2022, which claims priority to French Patent Application No. 2108763, filed Aug. 19, 2021, the contents of such applications being incorporated by reference herein.

FIELD OF THE INVENTION

The invention relates to an approach detection device. The invention is applicable more particularly to the detection of an approach of a hand and/or of a smartphone toward a bodywork element of a motor vehicle such as for example a handle of an opening element or a pillar of an opening element (door or trunk) in order to unlock the opening element, or toward an inductive cellphone charger of WPC charger type that is housed on board motor vehicles in order to charge the cellphone.

BACKGROUND OF THE INVENTION

Nowadays, vehicle door handles are equipped with devices for detecting an approach of a hand of a user or of a smartphone. The detection of an approach of and/or of contact by part of the user's body, for example the hand of a user, on the handle, coupled with the recognition of a portable user equipment, for example a "hands-free" electronic fob for remote access control, carried by said user, makes it possible to lock and unlock the opening elements of the vehicle. Thus, when the user, carrying the corresponding electronic fob identified by the vehicle, wishes to unlock the vehicle, they touch the door handle of the vehicle, and this then actuates an electric door release in the lock of the one or more opening elements of the vehicle, which is/are then automatically unlocked. By approaching or by pressing on a precise location on the door handle of the vehicle, called "unlocking zone", the door (or alternatively all of the opening elements) is (are) unlocked without any other action by the user. Conversely, when the user, still carrying the necessary fob identified by the vehicle, wishes to lock their vehicle, they close the door of their vehicle and press momentarily on another precise location of the handle, called "locking zone". This gesture makes it possible to automatically lock the opening elements of the vehicle.

These devices for detecting an approach of a hand for the purpose of unlocking/locking generally comprise two capacitive sensors, in the form of two electrodes that are electrically connected to a printed circuit, integrated in the door handle each in a precise locking or unlocking zone. Generally, one electrode is dedicated to each zone, that is to say one electrode is dedicated to detecting the approach of and/or contact by the hand of the user in the locking zone and one electrode is dedicated to detecting the approach of and/or contact by the hand of the user in the unlocking zone.

This device for detecting an approach of a hand furthermore comprises a radiofrequency, generally LF (low-frequency), antenna, although this antenna may also be a high-frequency or ultra-high-frequency antenna of UWB, BLE, Wi-Fi, 4G, 5G etc., type, or of NFC (near-field communication) type, that is to say any antenna or communication device for exchanging an identifier with the cellphone in order to authenticate it.

The detection device also comprises a vehicle electronic computer (ECU: abbreviation for "electronic control unit") that receives a presence detection signal from the capacitive sensors. The vehicle electronic computer has identified the user beforehand as being authorized to access this vehicle, or alternatively, it carries out this identification after receiving this presence detection signal. To this end, it sends an identification request via the radiofrequency antenna to the fob (or remote controller) carried by the user. This fob responds by sending its identification code to the vehicle electronic computer via RF (radiofrequency) waves or NFC, or UWB, or Wi-Fi, or BLE, etc. If the electronic computer recognizes the identification code as the one authorizing access to the vehicle, it triggers the locking/unlocking of the door (or of all of the opening elements). However, if the electronic computer has not received an identification code, or if the received identification code is incorrect, the locking or unlocking does not take place.

When the approach of a smartphone is to be detected, the detection device rather comprises an NFC ("near-field communication") reader, which is known per se, so as to detect, by radiofrequency exchange at 23.6 MHZ, the presence of a smartphone in the vicinity, the smartphone also being equipped with near-field communication means and being able to receive the identifier of said telephone in order to ensure that it is correctly recognized as being paired with the vehicle and thus carry out the locking/unlocking. This NFC reader is connected to a dedicated microcontroller.

Such vehicles are therefore equipped with door handles comprising a detection device equipped with a radiofrequency antenna, with two electrodes connected to a first capacitive detection microcontroller dedicated to the detection of an approach of a hand, and with an NFC reader, itself connected to a second microcontroller dedicated to the detection by NFC of a smartphone, all being integrated into a printed circuit.

However, the integration of all these electronic components poses a problem in terms of space taken up in the door handle, and entails non-negligible added costs. Furthermore, NFC detection is not reliable when smartphones contain very little metal, for example when they have plastic shells, or when the portable access device is a "tag", that is to say a fob consisting almost entirely of plastic.

SUMMARY OF THE INVENTION

An aspect of the invention therefore proposes a detection method as well as an associated device for overcoming the drawbacks of the prior art. More particularly, an aspect of the invention proposes a simple and inexpensive device for detecting both the approach of a hand and the approach of a smartphone using only NFC technology, that is to say near-field communication.

An aspect of the invention relates to a device for detecting an approach of a part of a user's body or of a portable user equipment, intended to be housed on board a motor vehicle, the device being noteworthy in that it comprises:

a. a near-field communication antenna configured to transmit signals at a high frequency selected between 3 and 30 MHz, said antenna being able to detect the approach of a portable user equipment and to communicate in near-field mode with said portable user equipment, said antenna comprising at least one winding that extends continuously in the form of a set of comb-shaped rods such that said antenna is able to generate a variation in capacitance in response to the approach of a part of a user's body, b. Control means for controlling said antenna, c. Measuring means for measuring a variation in imped-
ance of said antenna, generated by the variation in
capacitance.

In one preferred embodiment of the device according to
the invention, the winding defines a perimeter within which
said antenna extends continuously in the form of a set of
comb-shaped rods.

In one particular case, with the perimeter being rectan-
gular, the rods are in the form of copper tracks perpendicular
to a length or width of the perimeter.

The rods may be identical to one another.

Said antenna may comprise rods on two opposing sides of
the perimeter.

The measuring means for measuring a variation in imped-
ance may be in the form of software and measure any
variation in phase, in current or in voltage coming from the
antenna.

An aspect of the invention also relates to any vehicle door
handle, noteworthy in that it comprises a detection device
according to any one of the features listed above.

An aspect of the invention also relates to any inductive
charger for a portable user equipment, noteworthy in that it
comprises a detection device according to any one of the
features listed above.

Finally, an aspect of the invention is also applicable to any
motor vehicle, noteworthy in that it comprises a detection
device according to any one of the features listed above.

BRIEF DESCRIPTION OF THE DRAWINGS

Further features and advantages of aspects of the inven-
tion will become more clearly apparent upon reading the
following description. This description is purely illustrative
and should be read in conjunction with the appended draw-
ings, in which:

FIG. 6 is a schematic representation of a third embodi-
ment of the detection device according to the invention.

DETAILED DESCRIPTION OF THE PREFERRED EMBODIMENTS

Figure 2:
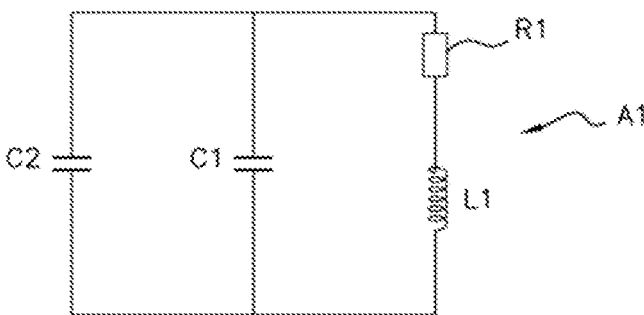
FIG. 2 is a circuit diagram of the near-field communica-
tion antenna modified according to an aspect of the inven-
tion.

The device for detecting an approach of a body part of a
user and of a portable user equipment is illustrated in FIG.
2.

The device D comprises a near-field communication
antenna A1, between 3 and 30 MHz, for example at 23.56
MHZ, able to detect and communicate with a portable user
equipment, for example a smartphone or a fob (also called
a "tag") equipped with NFC communication technology.

This type of NFC antenna A1 is associated with a micro-
processor and with software or other electronic means in
order to be able to exchange data with the portable user
equipment.

The detection of an approach of a portable user equipment
toward the detection device D is achieved by measuring the
variation in impedance of the NFC antenna A1. This is
known to a person skilled in the art and will not be described
in more detail here.

An aspect of the invention proposes for the antenna A1 to
comprise at least one winding E1, E2, E3 and for it to extend
continuously in the form of at least one set of comb-shaped
rods O1, O2 . . . . Oi, and N1, N2 . . . . Ni, connected to
control means 10.

The term "rods" refers to tracks in the form of copper,
having a predetermined width, for example flattened wires
or copper strips, which are connected to one another and
which constitute notches, protrusions, protuberances, exten-
sions of the NFC antenna A1, which itself consists of a
copper track.

The NFC antenna A1 may comprise a plurality of wind-
ings E1, E2, E3 of square, rectangular, oval or round shape.

Figure 1:
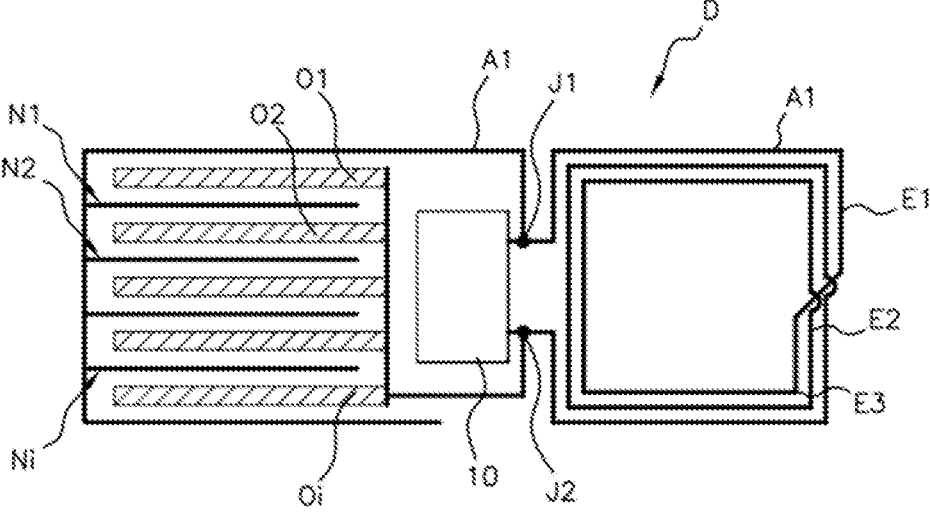
FIG. 1 is a schematic representation of the approach
detection device according to an aspect of the invention.
Figure 5:
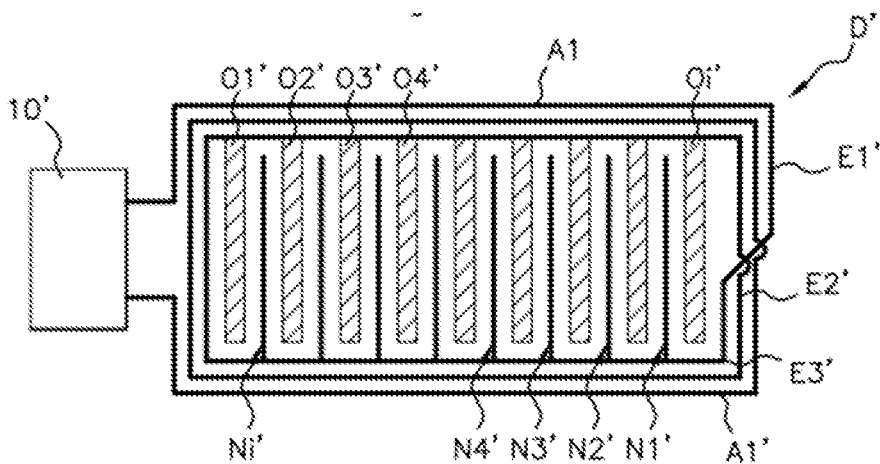
FIG. 5 is a schematic representation of one preferred
embodiment of the detection device according to the inven-
tion.
Figure 6:
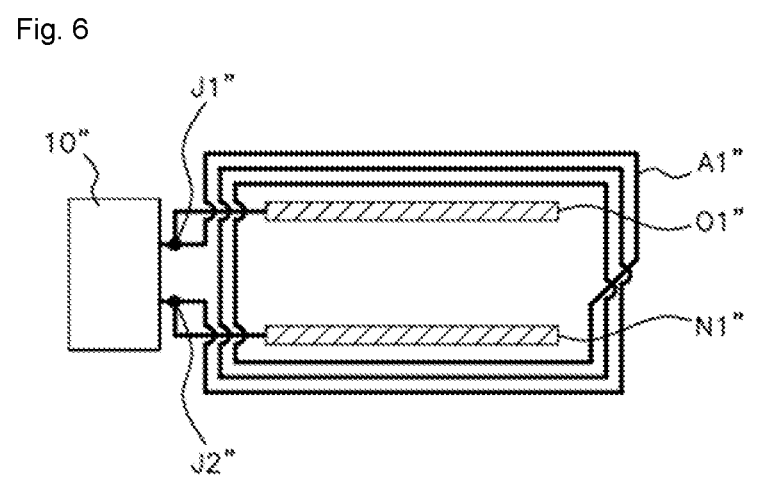

In FIGS. 1, 5 and 6, for explanatory purposes only, there
are three windings E1, E2, E3 (respectively E1', E2', E3') of
the NFC antenna A1, these being shown in a rectangular
shape, without this being limiting.

In FIG. 1, the NFC antenna A1 comprises three windings
E1, E2, E3, connected to control means 10. The NFC
antenna A1 is extended by way of two connections J1, J2
that are connected to the control means 10, forming two sets
of rods O1, O2 . . . Oi and N1, N2 . . . Ni. In this example,
the rods O1, O2 . . . Oi or N1, N2 . . . Ni of each respective
set are identical to one another, and all the rods of the two
sets are parallel to one another.

Of course, the rods O1, O2 . . . Oi and N1, N2 . . . Ni may
be inclined along an axis parallel to a length or width of a
rectangular winding of the NFC antenna A1, said rods may
be of different width from one another, and/or of different
geometry from one another, and/or with spacings of different
width from one another.

In one preferred embodiment of the detection device D'
according to the invention, but which is in no way limiting,
the one or more windings E1', E2', E3' define(s) a perimeter
within which said NFC antenna A1' extends continuously in
the form of at least one set of comb-shaped rods, in this
example two sets of rods O1', O2', O3' . . . Oi', and N1', N2',
N3' . . . Ni', each of the sets being comb-shaped, this being
illustrated in FIG. 5.

In FIG. 5, according to one preferred embodiment of the
invention, inside a rectangular perimeter defined by the
windings E1', E2', E3' of the NFC antenna A1'; the NFC
antenna A1' comprises two sets of rods O1', O2 . . . Oi'; or
N1', N2', N3' . . . Ni' each resembling a comb. Each of the
two sets O1', O2' . . . Oi'; or N1', N2', N3' . . . Ni' is
perpendicular to a length of the perimeter and the two sets
O1', O2' . . . OM'; or N1', N2', N3' . . . Ni' are each located
on opposing sides of the perimeter. Each rod O1', O2' . . . Oi'
of the first set is interleaved with a rod of the second set N1',
N2', N3' . . . Ni'.

In order to detect the approach of a hand of a user, the
detection device D, D' furthermore comprises control means
10, 10' for controlling the NFC antenna A1, able to measure
a variation in impedance of said NFC antenna A1.

Figure 7:
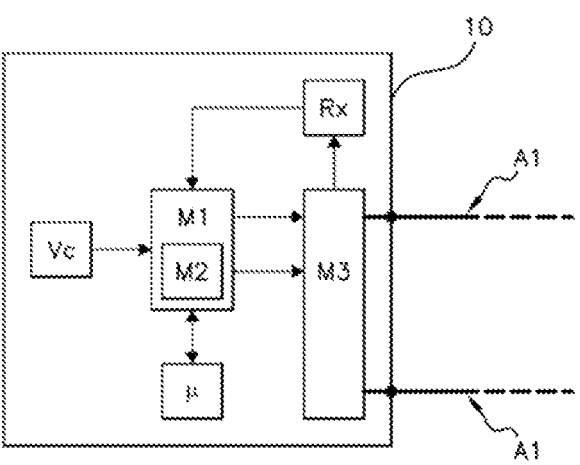
FIG. 7 is a schematic representation of the control means
for controlling the antenna of the detection device according
to an aspect of the invention.

The control means 10 are illustrated in FIG. 7. Said
control means 10 comprise: a voltage source Vc, a near-field
communication NFC driver M1 connected to a microcon-
troller µ, and then a matching circuit M3 comprising at least one filter and means for adjusting the impedance and frequency of the NFC antenna A1. The control means 10 also comprise a receiver circuit Rx dedicated to receiving data from the NFC antenna A1.

Said control means 10 for controlling an NFC antenna are known to a person skilled in the art and will not be described in more detail here.

According to an aspect of the invention, the control means 10 also comprise impedance-measuring means M2 able to measure any variation in impedance of the NFC antenna A1 thus modified as detailed below.

The impedance variation-measuring means M2 are for example contained in the NFC driver M1 and are in the form of software, and measure any variation in the phase, in the current or in the voltage coming from the NFC antenna A1 in order to deduce therefrom a variation in impedance of the NFC antenna A1.

The NFC antenna thus modified compared with the prior art, by virtue of the sets of rods, has a parasitic capacitance C2 that is markedly greater than the NFC antenna from the prior art.

Said parasitic capacitance C2 thus generated is then able to be measured and may cleverly be used to detect the approach of a part of the user's body, for example the approach of a hand of the user toward the detection device D.

The NFC antenna A1 according to an aspect of the invention is thus able to generate a variation in capacitance in response to the approach of a body part of a user that is able to be measured by measuring a variation in impedance.

FIG. 2 schematically shows the equivalent circuit diagram of the NFC antenna A1 modified in this way. The circuit is a resistor, inductor and capacitor RLC circuit consisting of a first branch comprising a resistor R1, connected to an inductor L1, a second branch comprising a capacitor C1, a third branch comprising a parasitic capacitance C2, all three branches being connected in parallel. The parasitic capacitance C2 is generated by virtue of the rods of the modified NFC antenna A1 and has a capacitance greater than the capacitor C1, which represents the capacitance created by the windings E1, E2, E3 of the NFC antenna A1.

The RLC circuit thus formed is sensitive not only to the approach of a portable user equipment, but also to the approach of a part of the user's body, for example their hand.

Indeed, upon the approach of a portable user equipment, inductive coupling (between the NFC antenna of the portable user equipment and the NFC antenna A1 of the detection device D) and capacitive coupling (between the rods of the modified NFC antenna A1 and the metal parts of the portable equipment) are created between said equipment and the detection device D, causing the value of each of the three parameters to vary, that is to say the resistance of the resistor R1, the value of the parasitic capacitance C2 and the inductance of the inductor L1.

The variation of these three parameters R1, L1, C2 brings about a notable change in the impedance of the antenna, that is to say a mismatching, which is measured by the impedance-measuring means M2.

Similarly, upon the approach of a hand of a user toward the detection device D, capacitive coupling is created between the portable user equipment and the NFC antenna A1 modified according to an aspect of the invention (in this case with the conductive surface of the rods), causing the value of the parasitic capacitance C2 to vary. The impedance of the NFC antenna A1 is then modified by this variation in capacitance C2, and is measured by the impedance-measuring means M2.

FIG. 6 illustrates a third embodiment of the invention, in which there are only two rods O1", N1" of the NFC antenna A1", these being parallel to one another and connected to the NFC antenna A1 at two connections J1", J2" that are connected to the control means 10" and to the input of the measuring means M2.

Figure 3:
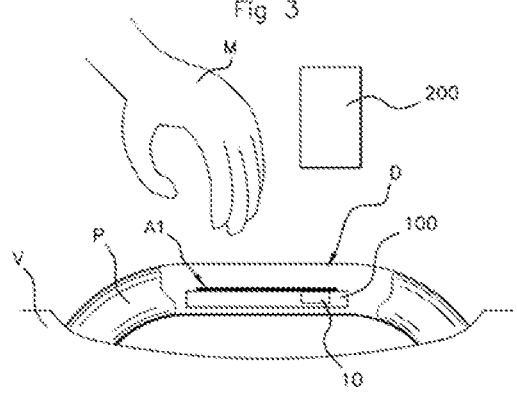
FIG. 3 is a schematic representation of a vehicle door
handle comprising the detection device according to an
aspect of the invention.

FIG. 3 shows a vehicle V door handle P comprising the detection device D according to an aspect of the invention. The NFC antenna A1 is located on a printed circuit 100 contained within the handle P, which also comprises the control means 10.

The detection device D thus makes it possible to detect the approach of a portable user equipment 200 and the approach of a hand M close to the handle P in order to unlock the door.

Figure 4:
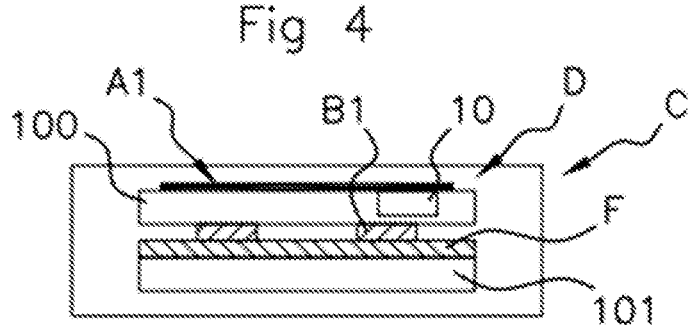
FIG. 4 is a schematic representation of an inductive
charger for a portable user equipment comprising the detec-
tion device according to an aspect of the invention.

FIG. 4 shows an inductive charger C for a portable user equipment 200 comprising the detection device D according to an aspect of the invention.

The charger C comprises a first printed circuit 101 on which there is located for example a ferrite F, which is itself located below a charging coil B1. Above the charging coil B1 is a second printed circuit 100 comprising the control means 10 and on which the NFC antenna A1 modified according to an aspect of the invention is etched.

Similarly, the detection device D according to an aspect of the invention makes it possible to detect the approach of a hand of a user and also the approach of a portable user equipment 200 close to or toward the charger C.

The invention therefore cleverly makes it possible, by modifying the NFC antenna, to be able to carry out not only detection of an approach of a portable user equipment, but also detection of an approach of a hand of a user by expediently using the parasitic capacitance of the antenna, the value of which is increased by modifying the footprint of the NFC antenna comprising comb-shaped protuberances generating said increase in parasitic capacitance. This invention is all the more noteworthy since the impedance measurement is sufficient to detect the approach of the hand and the approach of a portable user equipment, which was not possible in the prior art.

The invention claimed is:

1. A device for detecting an approach of a part of a user's body or of a portable user equipment, intended to be housed on board a motor vehicle, the device comprising:
  a) a control means; and
  b) a near-field communication antenna configured to transmit signals at a high frequency selected between 3 and 30 MHZ, said antenna being able to detect the approach of the portable user equipment and to communicate in near-field mode with said portable user equipment, said antenna consisting of:
    i) a first section having at least one winding connected to the control means for controlling said antenna, and
    ii) a second section electrically connected to, and extending continuously from the first section, the second section being in the form of a set of comb-shaped rods such that said antenna is able to generate a variation in capacitance in response to the approach of a part of the user's body, and
  wherein, the control means comprises measuring means for measuring a variation in impedance of said antenna, the impedance being modified by the variation in capacitance of the antenna in response to the approach of a part of the user's body, or upon the approach of the portable user equipment.

2. The detection device as claimed in claim 1, wherein the at least one winding defines a perimeter within which said antenna extends continuously in the form of a set of comb-shaped rods.

3. The detection device as claimed in claim 2, wherein, with the perimeter being rectangular, the rods are in the form of copper tracks perpendicular to a length or width of the perimeter.

4. The detection device as claimed in claim 2, wherein said antenna comprises rods on two opposing sides of the perimeter.

5. The detection device as claimed in claim 1, wherein the rods are identical to one another.

6. The detection device as claimed in claim 1, wherein the measuring means for measuring a variation in impedance are in the form of software and measure any variation in phase, in current or in voltage coming from the antenna.

7. A vehicle door handle, comprising a detection device as claimed in claim 1.

8. An inductive charger for a portable user equipment, comprising a detection device as claimed in claim 1.

9. A motor vehicle, comprising a detection device as claimed in claim 1.

10. A device for detecting an approach of a part of a user's body or of a portable user equipment, intended to be housed on board a motor vehicle, the device comprising:

a) a control means; and b) a near-field communication antenna configured to transmit signals at a high frequency selected between 3 and 30 MHZ, said antenna being able to detect the approach of the portable user equipment and to communicate in near-field mode with said portable user equipment, said antenna comprising:

i) a first section having one continuous winding electrically connected to the control means at a first connection point and a second connection point, the control means for controlling said antenna, and ii) a second section electrically connected to the control means at the first connection point and the second connection point, the second section being in the form of a set of comb-shaped rods such that said antenna is able to generate a variation in capacitance in response to the approach of a part of the user's body, and wherein, the control means comprises measuring means for measuring a variation in impedance of said antenna, the impedance being modified by the variation in capacitance of the antenna in response to the approach of a part of the user's body, or upon the approach of the portable user equipment.

* * * * *